(12) United States Patent
Vitalis et al.

(10) Patent No.: US 7,066,153 B2
(45) Date of Patent: Jun. 27, 2006

(54) JET PUMP WITH IMPROVED START-UP PROPERTIES AND FUEL DELIVERY SYSTEM EQUIPPED WITH SUCH JET PUMP

(75) Inventors: Tamas Vitalis, Szekesfehervar (HU); Zoltan Horvath, Szekesfehervar (HU)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 11/042,022

(22) Filed: Jan. 25, 2005

(65) Prior Publication Data

US 2005/0183781 A1 Aug. 25, 2005

(30) Foreign Application Priority Data

Jan. 27, 2004  (HU) .................................... 0400276

(51) Int. Cl.
*F02M 37/04* (2006.01)

(52) U.S. Cl. ...................... 123/514; 417/198; 137/565; 137/22; 123/509

(58) Field of Classification Search ................ 123/514, 123/509, 510, 456, 446; 417/151, 76, 77, 417/79, 87, 88; 137/565.17, 565.34, 565.22, 137/571
See application file for complete search history.

(56) References Cited

U.S. PATENT DOCUMENTS

| | | | | |
|---|---|---|---|---|
| 2,616,614 A | * | 11/1952 | Plummer, Jr. | 417/151 |
| 5,024,583 A | * | 6/1991 | Sasaki et al. | 417/198 |
| 5,082,426 A | * | 1/1992 | Sasaki et al. | 417/198 |
| 5,139,000 A | * | 8/1992 | Sawert | 123/514 |
| 5,732,684 A | * | 3/1998 | Thompson | 123/514 |
| 5,967,760 A | * | 10/1999 | Howie et al. | 417/80 |
| 6,123,511 A | * | 9/2000 | Sertier | 417/87 |
| 6,505,644 B1 | * | 1/2003 | Coha et al. | 137/565.22 |
| 6,619,272 B1 | | 9/2003 | Jones et al. | |
| 6,817,837 B1 | * | 11/2004 | Hutchinson et al. | 417/77 |
| 6,840,230 B1 | * | 1/2005 | Ichikawa et al. | 123/509 |
| 6,907,899 B1 | * | 6/2005 | Yu et al. | 137/565.22 |
| 2002/0031431 A1 | * | 3/2002 | Akiyama et al. | 417/198 |

* cited by examiner

*Primary Examiner*—Carl S. Miller
(74) *Attorney, Agent, or Firm*—Gregory P. Brown; Miller, Sobanski & Todd, LLC

(57) ABSTRACT

The present invention relates to a jet pump having a first inlet duct, a second inlet duct and an outlet duct having an outlet end, wherein the ducts are in fluid communication with each other at a central volume portion. The jet pump also includes a sleeve formed with a closed end at the bottom and partially enclosing said outlet duct. The sleeve has a lateral opening therein at a predetermined height above the outlet end of said outlet duct. A continuous flowpath with different flow directions is also present within the sleeve along the inner and outer surfaces of said outlet duct towards the lateral opening. The jet pump can be advantageously used in fuel delivery system with saddle fuel tanks.

13 Claims, 5 Drawing Sheets

JET PUMP WITH IMPROVED START-UP PROPERTIES AND FUEL DELIVERY SYSTEM EQUIPPED WITH SUCH JET PUMP

BACKGROUND

1. Field of the Invention

The invention relates to a jet pump with improved start-up properties. The jet pump can be used for the continuous supply of liquid fuel from remote containers or tanks to devices making use of the fuel. The invention further relates to the use of the jet pump in fuel delivery systems of internal combustion motor vehicles, especially in those systems which are equipped with a so-called saddle fuel tank.

2. Related Technology

Nowadays, saddle fuel tanks are widely used by the motor vehicle industry because of their greater fuel storing capacity compared to that of standard fuel tanks. Saddle fuel tanks are most frequently used with four wheel driven (4WD) and rear wheel driven vehicles and have two compartments connected by a channel located within the tank just above the saddle portion thereof. As a consequence of the two compartments, a special fuel delivery system should be installed in this type of fuel tanks to transfer the fuel from one of the compartments ("passive side") to the other ("active side") and then to the engine. To achieve this, in most cases in-tank fuel supply units are provided within the tank.

U.S. Pat. No. 6,619,272 describes an in-tank fuel supply unit to be mounted in the passive side of the fuel tank. The supply unit has a fuel pump in the fluid communication with a jet pump and pumps fuel from the passive side of the tank to the active side thereof when a second pump located in the active side is operating. Nevertheless, the jet pump can operate only if the fuel level is high enough to flood at least partially the mixing chamber of the jet pump. The jet pump cannot prime its mixing chamber by its driving flow, because all the flow collected in the mixing chamber is returned into the fuel tank when the fuel level is too low. Therefore, the operation of the jet pump is not independent of the fuel level; a well-defined minimal fuel level is required for the jet pump to start its operation. A further disadvantage of this solution dearly is the use of two fuel pumps, one in the active side and one in the passive side that makes the fuel delivery system more complicated and more expensive to manufacture. Furthermore, the use of two fuel pumps also raises the risk of a malfunction in the system.

In view of the background art, there is a need for such fuel delivery systems which are simple in construction, i.e. they contain active components only within the active side of the tank, reliable and cheap to manufacture. Furthermore, there is also a need for an improved jet pump that can be used in this type of the fuel delivery systems and enables reliable passage of fuel from the passive side of the saddle fuel tank, even if the fuel level within the tank is extremely low. In other words, there is a need for a jet pump being capable of operating independently of the fuel level within the saddle fuel tank.

The present invention achieves these objectives by providing a jet pump having a first inlet duct, a second inlet duct and an outlet duct having an outlet end, wherein said ducts are in fluid communication with each other at a central volume portion. The jet pump also comprises a sleeve formed with a closed end at the bottom and partially enclosing said outlet duct. The sleeve has a lateral opening therein at a predetermined height above the outlet end of the outlet duct. Furthermore, a continuous flowpath with different flow directions is present within the sleeve along the inner and outer surfaces of the outlet duct towards the lateral opening.

BRIEF DESCRIPTION OF THE DRAWINGS

The invention, its operation and further advantages will be explained in detail with reference to the accompanying drawings, wherein.

DETAILED DESCRIPTION OF THE INVENTION

Figure 1:
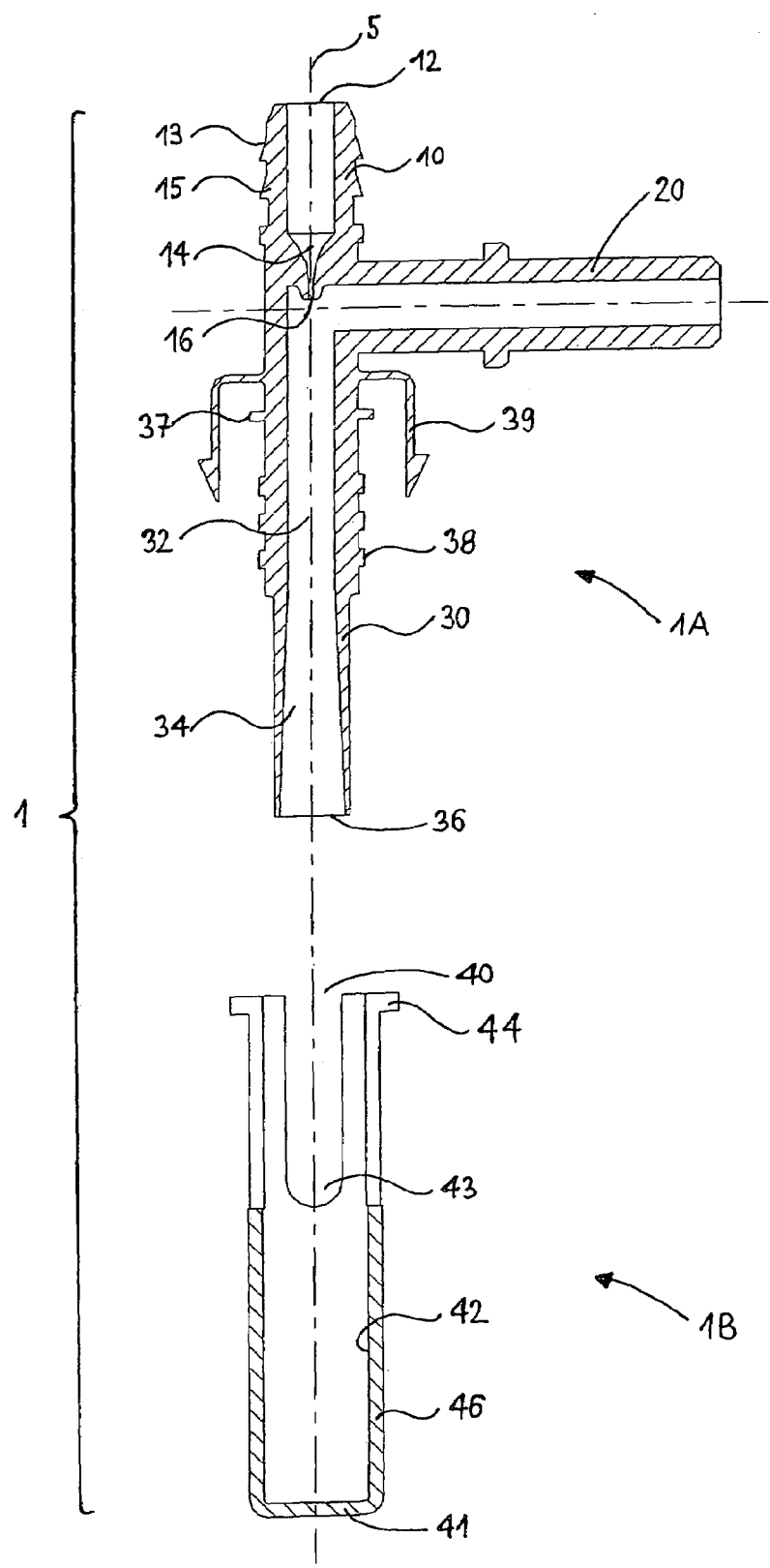
FIG. 1 shows the exploded cross-sectional view of a preferred embodiment of the jet pump embodying the principles of the invention.

Referring to FIG. 1, a jet pump 1 of the present invention comprises basically a pump body 1A and a pump sleeve 1B.

The pump body 1A has a first inlet duct 10, a second inlet duct 20 and an outlet duct 30. The first inlet duct 10 has an inlet end 12 and a nozzle portion 14. Outer surface 13 of the inlet duct 10, or at least a part thereof in the vicinity of the inlet end 12 is provided with ribs 15 for connection with an end portion of a first fuel delivery hose 54 (see FIG. 2). The inlet end 12 defines a hollow interior ending in the nozzle portion 14, which has a forwardly tapered inner surface, i.e. the inner cross-section of the nozzle portion 14 decreases gradually and terminates in a small orifice 16.

The outlet duct 30 comprises a mixing portion 32 close to the orifice 16 and opening into a diffusing portion 34. The inner cross-section of the mixing portion 32 is substantially constant, while the inner cross-section of the diffusing portion 34 increases gradually in size in downward direction. The diffusing portion 34 terminates in an outlet end 36 at the end of the outlet duct 30.

The first inlet duct 10 and the outlet duct 30 are coaxial, i.e. they have a common axis 5. The second inlet duct 20 closes an angle with this axis 5. The inner ends of the first inlet duct 10, the second inlet duct 20 and the outlet duct 30 communicate in a common central volume portion. Preferably, the second inlet duct 20 is perpendicular to the axis 5, this the pump body 1A has a T-shape. In this special case, the inlet ducts 10, 20 and the outlet duct 30 meet at the intersection of the T-shape. Furthermore, the outer end of the second inlet duct 20 is adapted for connection to a second fuel delivery hose 56 (see FIG. 2).

The sleeve 1B has an open end 40 with a rim 44, a closed end 41 and a solid cylindrical wall 46 extending between the two ends 40, 41. The inner surface of the wall 46 and the inner surface of the closed end 41 constitute the total inner surface 42 of the sleeve 1B. The sleeve 1B has furthermore at least one lateral opening 43 formed though the wall 46 between the two ends 40, 41. This opening 43 allows the fluid communication between the inside and the outside of the sleeve 1B. Furthermore, the outlet end 36 of the outlet duct 30 is in fluid communication with said opening 43 via a continuous flowpath 45 with different flow directions bound by the inner surface 42 of the sleeve 1B.

Figure 2:
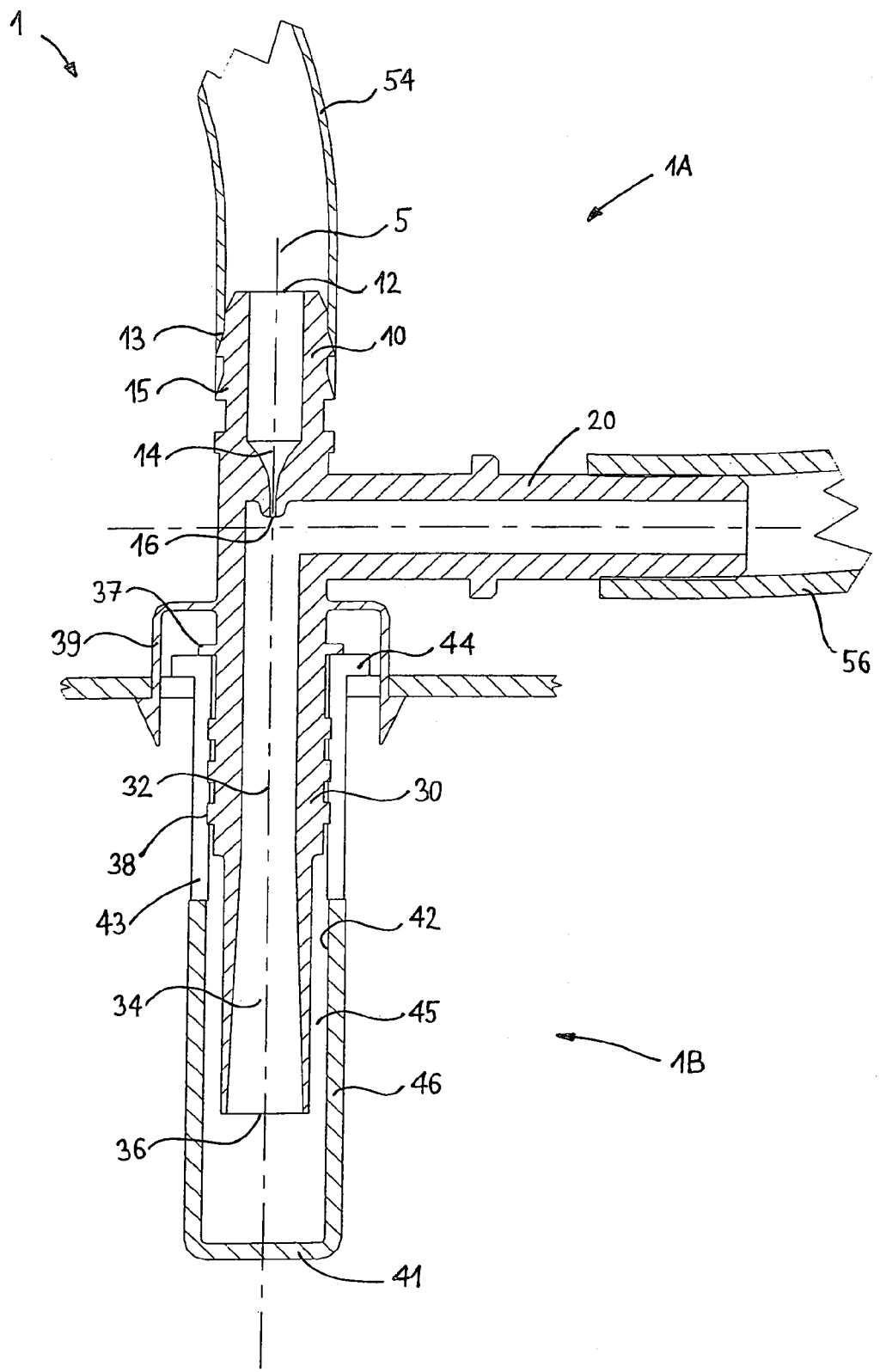
FIG. 2 is the cross-sectional view of the jet pump shown in FIG. 1 in its assembled state, that is when the pump body is received by the sleeve.

Referring now to FIG. 2, wherein the pump body 1A and the pump sleeve 1B are assembled to form the jet pump 1 according to the invention. The sleeve 1B covers the outlet duct 30 at least along the lower region thereof. As it is also shown in FIG. 2, to enable a control on how deep the outlet duct 30 can be inserted into the sleeve 1B, a flange 37 is provided on the outer surface of the outlet duct 30. Generally, the position of the flange 37 on the outlet duct 30 is chosen in such a way that if the pump body 1A is arranged within the sleeve 1B in its operational position, i.e. when the flange 37 abuts the rim 44 of the sleeve 1B, the outlet end 36 of the outlet duct 30 cannot reach the closed end 41 of the sleeve 1B. Described another way, the distance between the outlet end 36 and the closed end 41 is shorter than the distance between the opening 43 in the wall 46 and the closed end 41.

The opening 43 can take various shapes. In one embodiment of the jet pump 1, it is formed as one or more through bores in the wall 46. In a preferred embodiment, the opening 43 is prepared as one or more separate slots which extends/ extend from the open end 40 of the sleeve 1B towards the closed end 41 thereof parallel with the axis 5, as it is shown in FIGS. 1 and 2.

In certain further embodiments of the jet pump 1, to prevent any swivel of the pump body 1A around the axis 5 within the sleeve 1B, at least one fixing tab 38 is provided on the outer surface of the outlet duct 30; when the jet pump 1 is fully assembled, every fixing tab 38 engages a correspondent slot formed in the wall 46 especially for this purpose. The fixing tab(s) 38 should not obstruct fluid flow along the inner and outer surfaces of the outlet duct 30.

Figure 4A:
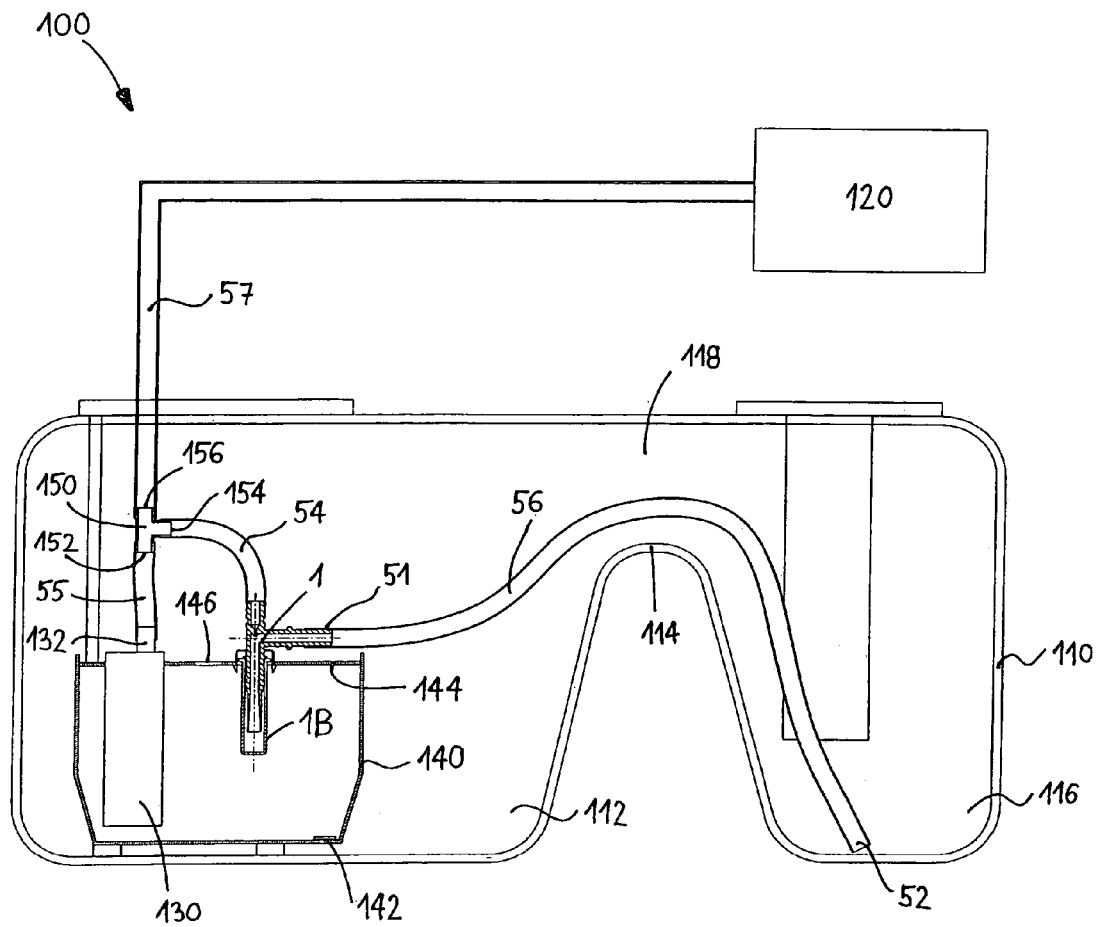
FIGS. 4A and 4B are schematic view of two possible embodiments of the fuel delivery system equipped with jet pumps embodying the principles of the present invention.
Figure 4B:
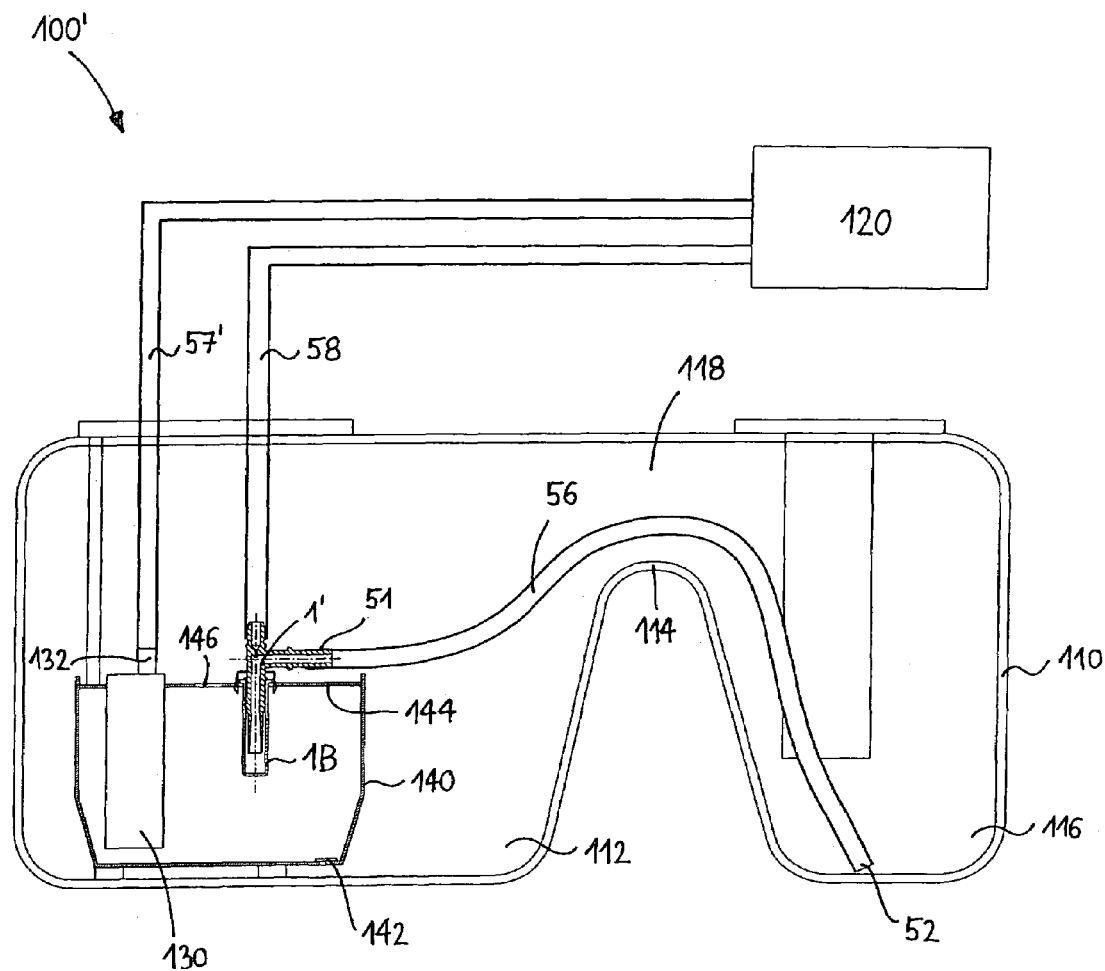

As the jet pump 1 is intended to be used in a fuel delivery system of a motor vehicle, it is preferably provided with suitable fastening means 39 for enabling its mounting into the fuel delivery system, as illustrated schematically in FIGS. 4A and 4B. The fastening means 39 can be arranged on the outer surface of the outlet duct 30 or it can be formed integrally therein. In most cases, the fastening means 39 are formed as catches to be engaged firmly the correspondent receiving elements formed in certain components of the fuel delivery system. The fastening means 39 can locate fully outside the sleeve 1B (see the embodiment shown in FIG. 2) or special grooves can be prepared for the fastening means 39 in the wall 46 in order that they could reach and engage said receiving elements. The lateral opening 43 can also take the role of these grooves, however, care should be taken that the fastening means 39 cannot obstruct the opening 43.

With respect to the inner/outer dimensions of the jet pump 1 according to the invention it should be noted that the inner diameter of the orifice 16 depends on the planned application of the jet pump 1; in general it is much smaller than the inner diameter of the mixing portion 32 and that of the second inlet duct 20. In particular, the inner diameter of the orifice 16 is preferably in the range of about 0.4–2.5 mm, the inner diameter of the second inlet duct 20 is preferably between about 4.0 and 5.0 mm, the inner diameter of the mixing portion 32 is preferably about 5.0 mm, and the outer diameter of the outlet duct 30, just at the outlet end 36, is preferably in the range of about 7.0–8.0 mm. Furthermore, the full length and the inner diameter of the sleeve 1B is preferably about 43.0 mm and about 11.0 mm, respectively. The distance between the closed end 41 and the opening 43 is preferably 17.0–18.0 mm, while the distance between the closed end 41 and the outlet end 36 is preferably 6.0–10.0 mm. Thus, in an exemplary jet pump 1 with the above measures, the opening 43 is formed at about the middle of the sleeve 1B. Moreover, if the axes of the sleeve 1B and the outlet duct 30 fall on the same line, then the inner surface 42 of the sleeve 1B will not get into contact with the outlet duct 30 along the flowpath 45.

Referring now to FIGS. 4A and 4B, the jet pump according to the invention is shown installed into different types of fuel delivery systems 100 and 100', respectively.

FIG. 4A illustrates a fuel delivery system 100 according to the present invention, useful essentially for petrol-operated motor vehicles (not shown) equipped with a saddle fuel tank 110, which stores fuel (in this case petrol, not shown) used to power the vehicle's engine 120. An upward projection 114 in the bottom wall of the saddle fuel tank 110 separates the tank 110 into two compartments, herein referred to as an active side 112 and a passive side 116 connected by a channel 118. In normal operation, fuel is stored in both the active side 112 and the passive side 116 of said saddle fuel tank 110.

In the active side 112 a reservoir 140 is mounted onto the bottom wall of the fuel tank 110. The reservoir 140 is provided with a check-valve 142 on its bottom to allow seeping of fuel from the active side 112 into the reservoir 140 at extremely low fuel levels within the active side of the tank 110. The reservoir 140 is further provided with an open spillway 146 on its top to enable the overflow of fuel being in excess amount within the reservoir 140. An electric fuel pump 130 and a jet pump 1 are also installed in the reservoir 140. The jet pump 1 is attached to the top of the reservoir 140 by means of its fastening means 39 (see e.g. FIG. 1) in such a position that its sleeve 1B and its outlet duct 30 within the sleeve 1B (see e.g. FIG. 1) penetrate into the interior of the reservoir 140, while the first and second inlet ducts 10, 20 of the jet pump 1 remain outside the reservoir 140. The fuel pump 130 is operated by a power supply (not shown). The fuel pump 130 has an outlet 132 which is connected to an inlet 152 of a three-way fuel diverter 150, preferably provided in the form of a T-valve or connector, via a fuel delivery hose 55. The diverter 150, besides the inlet 152, has two outlets 154 and 156; one of the outlet 154 is connected to the first inlet duct 10 of the jet pump 1 via a fuel delivery hose 54 to direction drive the jet pump 1, while the other outlet 156 is connected to the engine 120 via a conduit 57. As it is suggested by the working "fuel diverter", the three-way fuel diverter 150 passes the fuel supplied by the fuel pump 130 in two separate directions, namely to the engine 120 and to the jet pump 1.

Furthermore, the second inlet duct 20 (see e.g. FIG. 1) of the jet pump 1 communicates with the passive side 116 of the saddle fuel tank 110 via the fuel delivery hose 56 extending preferably within the channel 118 over the projection 114. The fuel delivery hose 56 has an outlet 51 connected to the second inlet duct 20 of the jet pump 1 and an inlet 52 located in a lower most portion of the passive side 116 of the tank 110.

Figure 3A:
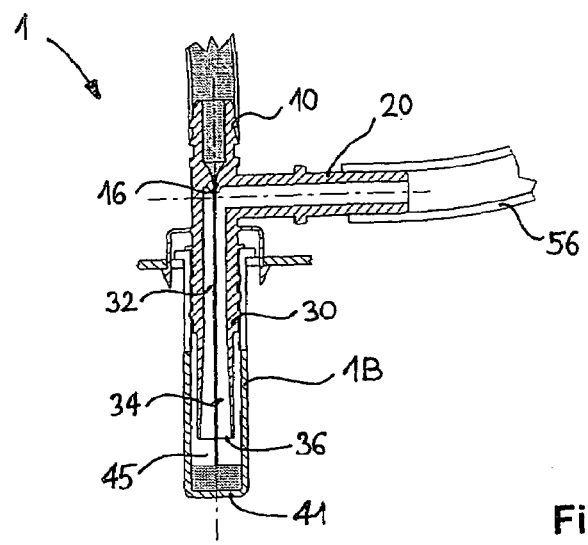
FIGS. 3A to 3C depict the operation of the jet pump according the principles of this invention.
Figure 3B:
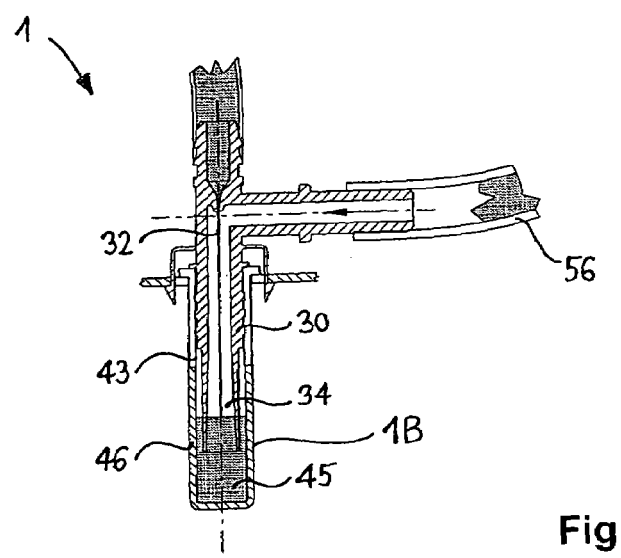
Figure 3C:
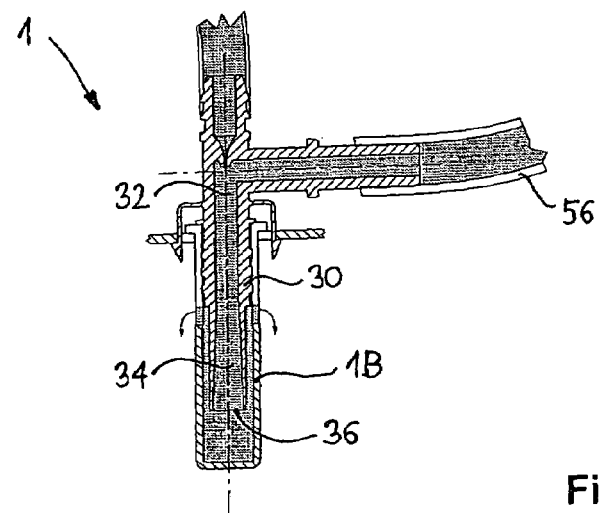

Considering the fuel delivery system 100 of FIG. 4A, the function of the fuel pump 130 is to pump fuel from the reservoir 140, and hence from the active side 112, to the vehicle's engine 120 in accordance with the engine's 120 needs. The function of the jet pump 1 is to draw fuel from the passive side 116 into the active side 112 of the fuel tank 110 reliably, even if the fuel level is extremely low within the tank 110. PARA0FIG. 4B shows a modified fuel delivery system 100', useful in particular for diesel oil operated motor vehicles. The difference between this system 100' and the system 100 illustrated in FIG. 4A is that here no fuel diverter is used, but the outlet 132 of the fuel pump 130 is directly connected to the engine 120 via a conduit 57' and a return supply tube 58 leads from the engine 120 to the first inlet duct 10 (see e.g. FIG. 1) of the jet pump 1'. The result of this modification is that, in the present embodiment, the fuel pump 130 drives indirectly the jet pump 1' (i.e. via the engine 120 by means of the fuel supplied in excess to the engine 120). Further components of system 100', the function and the mutual arrangement thereof are analogous with the components of the system 100, and their functions and mutual arrangement, thus the system 100' is not discussed in more detail. PARA0Referring now to FIGS. 3A to 3C, the operation of the jet pump 1, 1' according to the present invention is as follows. PARA0FIG. 3A shows the first few moments of the jet pump's operation; the engine has been just switched on and the electric fuel pump 130 just started to deliver fuel to the engine 120. A preset portion of the fuel delivered towards the engine 120 enters into the first inlet duct 10 of the jet pump 1 through either the fuel diverter 150 (in system 100 shown in FIG. 4A) or the engine 120 as a return flow of excessively supplied, unused fuel (in system 100' shown in FIG. 4B). As it is well-known for a person skilled in the relevant art, the fuel portion always represents a more or less constant flow rate, which is due to either a control on the suction force exerted by the fuel pump 130—wherein the control is realized by changing the voltage applied on the fuel pump 130 in accordance with the engine's fuel requirement—(as happens in the system 100) or the constant flow rate of the return fuel flow itself (as happens in the system 100'). The portion of the fuel runs through the orifice 16 (see e.g. FIG. 1), then through the outlet duct 30 and begins to fill up the flowpath 45 closed down by the pump sleeve 1B. At this stage, the diffusing portion 32 is not yet filled with fuel, and the jet pump 1 exerts a suction effect on the fuel being present in the passive side 116 of the saddle fuel tank 110 (see e.g. FIG. 4A), which is due to the depression within the outlet duct 30 caused by the high speed fuel jet passing through the orifice 16. This suction effect is, however, insufficient to lift up the fuel to the jet pump 1 in the fuel delivery hose 56. As a consequence, fuel transfer from the passive side 116 to the active side 112 of the saddle fuel tank 110 cannot start. PARA0As shown in FIG. 3B, the fuel jet flowing out of the orifice 16 quickly fills up the flowpath 45 to a level which is determined basically by the position of the lateral opening 43 formed in the wall 46 of the sleeve 1B. This fuel level is high enough to fill up at least partially the outlet duct 30, i.e. the diffusing portion 34 and/or the mixing portion 32. Now, the fuel jet leaving the orifice 16 collides with the fuel already being present in the outlet duct 30. During the collision, bubbles and foam are created. By the bubbles and the foaming mixture of air and fuel appears. The air comes from the upper part of the mixing portion 32 and from the fuel delivery hose 56 connected to the second inlet duct 20 of the jet pump 1. The fuel jet with high velocity transfers its momentum to the air-fuel mixture. Due to the transferred momentum, the air-fuel mixture moves out of the diffusing portion 34 and/or mixing portion 32, vacuum appears in the neighborhood of the orifice 16, and hence in the fuel delivery hose 56. Due to the increased vacuum, the fuel transfer from the passive side 116 to the active side 112 of the saddle fuel tank 110 (see e.g. FIG. 4A) starts. PARA0As the air is drawn out of the fuel delivery hose 56, all the hose 56, the mixing portion 32 and the diffusing portion 34 are filled up with fuel in their full lengths, and no air will be present within the jet pump 1 any longer. From now on, the jet pump 1 operates like an ordinary jet pump having no sleeve; until the engine 120 operates, the pump sleeve 1B surrounding the outlet duct 30 has no influence on the operation of the jet pump 1 any more, except constituting an increased flow resistance. PARA0Briefly summarized: such a jet pump is developed that is capable of initiating fuel transport from the passive side into the active side of a saddle fuel tank without the need for the fuel delivery hose 56 to be primed prior to the start of the jet pump's operation. Thus, to prevent draining of said hose 56 when the system 100, 100' is not in operation, no foot valve is required in the inlet 52 of said hose 56 (see FIG. 4A). Furthermore, the increase in the suction effect of the jet pump according to the invention as a result of the momentum transfer described allows the manufacturing of a jet pump having an orifice 16 greater in diameter compared to the orifice diameters of jet pumps without sleeves presently used in fuel delivery systems. Hence, flow rates through jet pumps according to the invention can be reduced which results in better fuel economy of the vehicles engine 120. Furthermore, due to the construction of the jet pump, the proposed fuel delivery systems 100, 100' provide improved start-up ability at any fuel level within the tank 110 and at any angle of inclination of the vehicle (in normal use). PARA0The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A fuel delivery system for a vehicle equipped with an engine comprising:
   a saddle fuel tank having an active side and a passive side;
   a reservoir installed into the active side of the fuel tank, the reservoir having a check-valve in its bottom and a spillway on its top;
   a fuel pump mounted in the reservoir, the fuel pump having an inlet and an outlet:
   a fuel diverter In the form of a T-valve having an inlet in fluid communication with the outlet of the fuel pump, a first outlet, and a second outlet in fluid communication with the engine;
   a jet pump mounted to the reservoir, wherein the jet pump having a first inlet duct having an orifice, the first inlet duct being in fluid communication with the first outlet of the fuel diverter;
   the jet pump having a second inlet duct in fluid communication with the passive side of the saddle fuel tank; and
   the jet pump having an outlet duct provided with an outlet end, the outlet being in fluid communication with the inside of the reservoir; and
   a fuel delivery hose having an Inlet located within the passive side of the saddle fuel tank and an outlet connected to the second inlet duct of the jet pump;
   the jet pump having a sleeve formed with a closed end at the bottom and partially enclosing the outlet duct, the sleeve including a lateral opening therein at a predetermined height above the outlet end of the outlet duct.

2. The fuel delivery system according to claim 1, wherein the inner diameter of the orifice in the jet pump is in the range of 0.4–0.5 mm.

3. A fuel delivery system for a vehicle equipped with an engine, comprising:
   a saddle fuel tank having an active side and a passive side;
   a reservoir installed into the active side of the fuel tank, the reservoir having a check-valve in its bottom and a spillway on its top;
   a fuel pump mounted in the reservoir, the fuel pump having an inlet and an outlet;
   a conduit providing fluid communication between the fuel pump and the engine, said conduit having a first end and a second end, said first end being connected to the outlet of the fuel pump and the second end being connected to the engine;

a return supply tube having a first end and a second end, the first end of the return supply tube being connected to the engine;

a jet pump mounted to the reservoir, wherein the jet pump having a first inlet duct having an orifice, the duct being connected to the second end of the return supply tube, the jet pump having a second inlet duct in fluid communication with the passive side of the saddle fuel tank, and the jet pump having an outlet duct provided with an outlet end, the duct being in fluid communication with the inside of the reservoir, and a fuel delivery hose having an inlet located within the passive side of the saddle fuel tank and an outlet connected to the second inlet duct of the jet pump;

the jet pump having a sleeve formed with a closed end at the bottom and partially enclosing the outlet duct, the sleeve including a lateral opening therein at a predetermined height above the outlet end of the outlet duct.

4. The fuel delivery system according to claim 3, wherein the engine is a diesel oil operated engine, and tile inner diameter of the critics in the jet pump is In the range of 2.0–2.5 mm.

5. A jet pump with improved start-up properties comprising:

a pump body having a first inlet duct, a second inlet duct, and an outlet duct, said ducts defining respective hollow interiors communicating with each other at a mixing portion;

the hollow interior of said outlet duet defines a diffusing portion having an increasing inner cross-section away from the mixing portion and having an outlet end;

the first inlet duct includes an inlet end communicating with a nozzle portion having a decreasing inner cross-section towards the mixing portion and defining an orifice opening towards the mixing portion;

the second inlet duct is arranged at an angle relative to the first inlet and outlet ducts;

a sleeve at least partially covering and arranged around the outlet duct, the sleeve having an open end, a closed end, a solid wall and at least one lateral opening defined through the wall between the open and closed ends;

the outlet end of the outlet duct being located deeper in the sleeve than the lateral opening, whereby a continuous flowpath with different flow directions is formed within the sleeve along the inner and outer surfaces of the outlet duct towards the lateral opening; and wherein said opening is made in the form of a slot in the wall of the sleeve.

6. A jet pump with improved start-up properties comprising:

a pump body having a first inlet duct, a second inlet duct and an outlet duct, said ducts defining respective hollow interiors communicating with each other at a mixing portion;

the hollow interior of said outlet duct defines a diffusing portion having an increasing inner cross-section away from the mixing portion and having an outlet end;

the first inlet duct Includes an inlet end communicating with a nozzle portion having a decreasing inner cross-section towards the mixing portion and defining an orifice opening towards the mixing portion;

the second inlet duct is arranged at an angle relative to the first inlet and outlet ducts;

a sleeve at least partially covering and arranged around the outlet duct, the sleeve having an open end, a closed end, a solid wall and at least one lateral opening defined through the wall between the open and closed ends; and the outlet end of the outlet duct being located deeper in the sleeve than the lateral opening, whereby a continuous flowpath with different flow directions is formed within the sleeve along the inner and outer surfaces of the outlet duct towards the lateral opening;

wherein the open end of the sleeve is provided with a rim, and wherein the outlet duct is provided with a flange on its outer surface to bear against the rim of the open end for controlling the depth of insertion of the outlet duct into the sleeve.

7. A jet pump with improved start-up properties comprising:

a pump body having a first inlet duct, a second inlet duct and an outlet duct, said ducts defining respective hollow interiors communicating with each other at a mixing portion;

the hollow interior of said outlet duct defines a diffusing portion having an increasing inner cross-section away from the mixing portion and having an outlet end;

the first inlet duct includes an inlet end communicating with a nozzle portion having a decreasing inner cross-section towards the mixing portion and defining an orifice opening towards the mixing portion;

the second inlet duct is arranged at an angle relative to the first inlet and outlet ducts;

a sleeve at least partially covering and arranged around the outlet duct, the sleeve having an open end, a closed end, a solid wall and at least one lateral opening defined through the wall between the open and closed ends; and the outlet end of the outlet duct being located deeper in the sleeve than the lateral opening, whereby a continuous flowpath with different flow directions is formed within the sleeve along the inner and outer surfaces of the outlet duct towards the lateral opening;

wherein at least one fixing tab fitting into a groove formed in the wall of the sleeve is present on the outer surface of the outlet duct for preventing swivel of the pump body within the sleeve around said axis.

8. The jet pump according to claim 5, wherein the sleeve and the cutlet duct have a common axis.

9. The jet pump according to claim 5, wherein the slot extends generally parallel with said axis from the open end of the sleeve towards the closed end thereof.

10. The jet pump according the claim 9, wherein the slot extends parallel to an axis, the axis being a common axis between the sleeve and the outlet duct.

11. The jet pump according to claim 5, wherein the outlet duct and the inner surface of the sleeve are spaced apart along the flowpath.

12. The jet pump according to claim 5, wherein it comprises fastening means for a firm installation.

13. The jet pump according to claim 5, wherein the first inlet duct and the outlet duct have a common axis.

* * * * *